(12) United States Patent
Heikens et al.

(10) Patent No.: US 7,778,279 B2
(45) Date of Patent: Aug. 17, 2010

(54) METHOD AND APPARATUS FOR INSTANT CHANNEL CHANGE

(75) Inventors: Heico Heikens, Antwerp (BE); Danny De Vleeschauwer, Evergem (BE); Willem Jozef Amaat Acke, Rijmenam (BE)

(73) Assignee: Alcatel-Lucent, Paris (FR)

( * ) Notice: Subject to any disclaimer, the term of this patent is extended or adjusted under 35 U.S.C. 154(b) by 335 days.

(21) Appl. No.: 11/758,652

(22) Filed: Jun. 5, 2007

(65) Prior Publication Data

US 2007/0297448 A1   Dec. 27, 2007

(30) Foreign Application Priority Data

Jun. 6, 2006   (EP)   ................................. 06290933

(51) Int. Cl.
- H04H 20/28   (2008.01)
- H04J 1/00   (2006.01)
- G01R 31/08   (2006.01)
- H04N 7/173   (2006.01)

(52) U.S. Cl. .......................... 370/486; 370/235; 725/92

(58) Field of Classification Search ................ 370/235, 370/486; 725/87, 92

See application file for complete search history.

(56) References Cited

U.S. PATENT DOCUMENTS

| | | | |
|---|---|---|---|
| 7,111,316 B1 * | 9/2006 | Zahorjan et al. | 725/97 |
| 2003/0208765 A1 | 11/2003 | Urdang et al. | |
| 2004/0187160 A1 * | 9/2004 | Cook et al. | 725/94 |
| 2004/0210937 A1 * | 10/2004 | Huizer et al. | 725/87 |
| 2004/0261126 A1 * | 12/2004 | Addington et al. | 725/135 |

(Continued)

FOREIGN PATENT DOCUMENTS

WO   WO 03/009598 A1   1/2003

OTHER PUBLICATIONS

Golubchik L., et al.: "Reducing I-O Demand in Video-On-Demand Storage Servers" 1995 ACM Sigmetrics Joint International Conference on Measurement and Modeling of Computer Systems, Ottawa, May 15-19, 1995, ACM Sigmetrics Joint International Conference on Measurement and Modeling of Computer Systems, New York, ACM, US, vol. 23 1, May 1, 1995, pp. 25-36, XP000537013.

(Continued)

Primary Examiner—Ricky Ngo
Assistant Examiner—Paul Masur
(74) Attorney, Agent, or Firm—Harness, Dickey & Pierce, P.L.C.

(57) ABSTRACT

The network unit includes a signaling unit and a video transmitting unit. The signaling unit is configured to receive a request from a decoding device requesting transmission of the video channel. The video transmitting unit is configured to transmit the video channel towards the decoding device, initially as a dedicated multimedia stream dedicatedly supplied to the decoding device and including an anchor frame as a first transmitted video frame, and further in time as a common multimedia stream commonly supplied to a plurality of decoding devices. The video transmitting unit is further configured to transmit the video channel within the dedicated multimedia stream having an earlier time frame with respect to transmission of the video channel within the common multimedia stream, and the video channel is to be initially played at an averagely slower motion speed than the nominal motion speed that the common multimedia stream is to be played.

21 Claims, 6 Drawing Sheets

U.S. PATENT DOCUMENTS

2006/0025149 A1* 2/2006 Karaoguz et al. ........ 455/452.2

OTHER PUBLICATIONS

Aggarwal C., et al.: "On Optimal Piggyback Merging Policies for Video-On-Demand Systems" 1996 ACM Sigmetrics International Conference on Measurement and Modeling of Computer Systems, Philadelphia, May 23-26, 1996, ACM Sigmetrics International Conference on Measurement and Modeling of Computer Systems, New York, ACM, US, May 23, 1996, pp. 200-209, XP000679326.

Carter S. W., et al. "Improving Bandwidth Efficiency of Video-On-Demand Servers" Computer Networks and ISDN Systems, North Holland Publishing, Amsterdam, NL, vol. 31, No. ½, Jan. 14, 1999, pp. 111-123, XP000700330.

* cited by examiner

METHOD AND APPARATUS FOR INSTANT CHANNEL CHANGE

BACKGROUND

1. Technical Field

The present invention relates to a network unit adapted to transmit a video channel to be played at a nominal motion speed.

2. Description of Related Art

A network unit is for instance an access unit for connecting subscribers to a data communication network, such as a Digital Subscriber Line Access Multiplexer (DSLAM), an Ethernet bridge, an edge router, etc, or any intermediate network unit, which subscribers are coupled to, or a video server for supplying video channels to subscribers.

An example of a dedicated multimedia stream is a unicast stream bound to a particular unicast address, being a unicast network address such as a unicast IP address, or a unicast hardware address such as a unicast MAC address.

An example of a common multimedia stream is a multicast stream bound to a particular multicast address, being a multicast network address such as a multicast IP address, or a multicast hardware address such as a multicast MAC address. Another example of a common multimedia stream is a broadcast stream bound to a broadcast address, being a network broadcast address such as the broadcast IP address 255.255.255.255, or a broadcast hardware address such as the broadcast MAC address FF:FF:FF:FF:FF:FF:FF:FF.

A video channel is a sequence of video pictures or video frames that are displayed on screen at a nominal frame rate, typically at 25 or 30 frames per second (fps). The nominal frame rate value is chosen according to the human visual remanence, and is such that the viewer perceives successive video frames as a continuous motion sequence.

Picture information are digitally captured, encoded, transmitted over the air (e.g., by broadcast, wireless or mobile communication), by satellite, or via a wired communication network (e.g., via a local loop or an optical fiber), or read from a carrier medium (e.g., a Digital video Disc (DVD), a Compact Disc (CD) or a video tape), typically as part of a multimedia stream that comprises further multimedia information, such as one or more audio channel, one or more language sub-title, etc, and are ultimately decoded to refresh the displayed picture, nominally at the same rate as the nominal frame rate, which typically matches the nominal capture rate, thereby resulting in a nominal motion speed, that is to say a motion speed that fits the real-time perception of spatial motion.

Inter-frame encoding is used to reduce the encoded bit rate while maintaining an acceptable picture quality by coding a video frame with reference to previous and/or subsequent video frames.

Examples of video encoding using inter-frame encoding is MPEG1 (ISO-IEC), MPEG2 (ISO-IEC), MPEG4 (ISO-IEC), H.261 (ITU-T), H.263 (ITU-T), H.264 (ITU-T=MPEG4 part 10), VC-1 (SMPTE), Real video and ON2 Macromedia Flash proprietary codecs, etc.

In a motion sequence, individual frames are grouped into a Group of Pictures (GoP). A GoP comprises one independent frame (or intra-frame, or anchor frame, or key frame, or I frame) as reference frame, and further dependent frames (or inter-frames, or delta frames) that ultimately relate to this independent frame.

Independent frames are encoded without referencing any other video frame, e.g. by reducing the spatial redundancy in the picture. Dependent frames are encoded by means of forward and/or backward prediction techniques such as motion compensation, and do refer other video frames, thereby achieving a higher compression ratio. Examples of dependent frames are predictive frames (or P frames), which are encoded with reference to the previous I or P frame, and bi-directional interpolative frames (or B frames), which are encoded with reference to both the previous and the next I or P frame.

As an example, a typical GoP is a sequence of video frames of the form I B1 B2 P1 B3 B4 P2 B5 B6 P3 B7 B8, wherein P1 is encoded with reference to I, B1 and B2 with reference to both I and P1, P2 with reference to P1, B3 and B4 with reference to both P1 and P2, and so on, and eventually B7 and B8 with reference to P3 and the next incoming I frame.

The GoP size does not necessarily need to be fixed, and the encoder may decide on a per video frame basis which frame type to use.

It is to be noticed that video frames are re-ordered before being transmitted in such a way that they can be decoded at once as they are received without waiting for further incoming frames.

Referring to the previous example, the GoP will be transmitted as $I_k B7_{k-1} B8_{k-1} P1_k B1_k B2_k P2_k B3_k B4_k P3_k B5_k B6_k I_{k+1} B7_k B8_k$, and so on, where the subscript k denotes an arbitrary GoP index.

It is also to be noticed that a frame may relate to a frame of another GoP (open GoP versus closed GoP).

Referring to the previous example, the video sequence I B1 B2 P1 B3 B4 P2 B5 B6 P3 B7 B8 forms an open GoP.

When a user initiates a channel change from one video channel to another, the video replication point (the video server or an intermediate network unit to which the user is connected to or coupled to) stops sending frames of the prior video channel, and starts sending frames of the new channel.

Meanwhile, the decoding device flushes its decoding (or de-jitter) buffer and waits for video frames of the newly requested channel. The first received frame is likely to not be an independent frame, making decoding (and thus displaying) of the new channel impossible until a new independent frame is received. Thereupon, the decoding device shall still wait for a sufficient number of frames to be received before continuously playing the video channel at the nominal motion speed.

The decoding device may also experience some time variations in receiving video packets (also referred to as packet jitter), and/or video packets may be lost and/or corrupted. Consequently, the decoding device may buffer even more video frames so that a continuous playout of the video channel can be ensured in such an adverse environment.

As a conclusion, the time between channel change and channel display can be significantly higher than the duration of one GOP, giving the user a slow-responding zapping experience.

Different solutions that optimize the effective channel switching time and/or that improve the user experience are known from the art.

A first optimization consists in caching the last-forwarded independent frame at a replication point, and in transmitting the so-cached independent frame upon channel change. The decoding device quickly receives and decodes this I frame. While a new GoP is awaited for, a still image is displayed of the single decoded I frame. This results in an improved user experience because the user already sees the new channel albeit in a still image.

A further optimization consists in caching a few GoPs of the video channel at a video replication point, and to dedicatedly supply a video sequence, which starts with the last-forwarded independent frame, at a higher transmit rate, typically at 1.3 times the nominal frame rate. After a while, the decoding device is expected to catch up the difference with the steady state users that are supplied with a common multimedia stream, and from that time onwards, to switch to common transmission mode.

This solution is disadvantageous in that it brings about traffic burstiness upon channel change, and in that the network shall be consequently and accordingly over-dimensioned. Another drawback of this solution is that steady state users are not synchronously viewing the video channel, since the amount of video frames that are buffered depends on the time occurrence of a channel change with respect to the GoP that is currently being transmitted: the further the last transmitted independent frame, the more frames in the decoding buffer, the more watching delay.

Further optimization consists in dropping lesser important frames within the dedicatedly supplied video sequence, such as B frames, thereby reducing the induced network overload.

Still a further optimization is to dedicatedly supply a lower-quality copy of the requested channel.

SUMMARY

It is an object of the present invention to further improve the user experience without the aforementioned drawbacks.

According to the invention, this object is achieved due to the fact that said video transmitting means is further adapted to transmit said video channel within said dedicated multimedia stream ahead of time with respect to transmission of said video channel within said common multimedia stream, and that said video channel is to be initially played at an averagely slower motion speed (or rendering rate, or playout cadence), thereby allowing transmission of said video channel towards said particular decoding unit to be resumed with said common multimedia stream.

The video sequence that is initially sent upon channel change, and that can be immediately decoded and further displayed, is transmitted ahead of time with respect to the transmission of the same video sequence towards the steady state users watching the same video channel.

The decoding device is expected then to slow down the motion speed so as to catch up with the steady state users. This is just like if people are walking behind a person and that person is slowing down his speed to catch up with them.

After a while, the decoding device will decode (and further display) a video frame that is prior in time with respect to the video frame that is currently transmitted to (or received by) the steady state users. From that video frame onwards, the decoding device can be fed with the common multimedia stream while ensuring a continuous playout of the video channel.

A slower motion speed is achieved by using the same picture information over a larger time scale, or alternatively by decoding video frames at a decoding rate that is lower than the nominal frame rate, thereby causing the de-jitter buffer to fill up. Yet, the displayed picture shall be refreshed at the nominal frame rate for video motion to remain smooth, for instance by repeating a few video frames here and there, or by means of frame interpolation or other digital processing techniques.

It is to be noticed that the slower motion speed does not need to be constant, but may vary over time till the nominal motion speed is reached. What is of first matter with regard to the invention is that the video channel is initially played at a motion speed that is averagely slower that the nominal motion speed, or alternatively that the video frames are decoded at a decoding rate that is averagely lower than the nominal frame rate.

A network unit according to the invention is advantageous in that no additional bandwidth is provisioned within the network for supporting instant channel change, and thus no additional cost is incurred by the network operator.

A network unit according to the invention is further advantageous in that channel change is fast and smooth, since a slower motion speed is almost unnoticeable (up to some extent of course). There might be some sound artifacts, yet sound digital processing techniques exist, e.g. based on silence detection, that keep them at an acceptable quality level.

This altogether results in an improved user experience.

An alternative embodiment of a network unit according to the invention is characterized in that said network unit is further adapted to control a motion speed at which said video channel is to be played.

By controlling the motion speed, one indirectly controls the buffer filling level of the decoding device, and further which one of the video frames the user is currently watching.

This embodiment is further advantageous in that the steady state users, including the newly zapping user, can view the same video channel synchronously, which can be of utmost importance for interactive TV applications.

In one embodiment, said averagely slower motion speed is assigned a pre-determined value.

This pre-determined value, together with the initial timing advance value between the dedicated and common multimedia streams, is used by the network unit to easily compute the time at which the nominal motion speed shall be resumed for viewer to watch the video channel synchronously.

In another embodiment, said signaling means is further adapted to receive from said decoding device said averagely motion speed.

By getting the averagely slower motion speed directly from the decoding device, the network unit can accommodate different decoding equipment and channel transition algorithms.

In still another embodiment, said video transmitting means is further adapted to transmit said video channel as said common multimedia stream once said nominal motion speed is to be resumed.

This embodiment is particularly advantageous in that no further control information and/or signal need be exchanged between the network unit and the decoding device. Instead, the decoding device is expected to play the video channel at the averagely slower motion speed when the video channel is supplied as a dedicated multimedia stream, and at the nominal motion speed when the video channel is supplied as a common multimedia stream.

Other embodiments can be thought of, such as embedding within the multimedia stream some control information whereby the motion speed can be derived, or appending to each video frame the instantaneous motion speed at which that video frame shall be played, or sending specific control signal requesting the decoding device to apply a particular motion speed value.

A further embodiment of the present invention is characterized in that said signaling means is further adapted to receive a control signal from said decoding device whereby transmission of said common multimedia stream is requested.

In this embodiment, it is up to the decoding device to control when the nominal motion speed is to be resumed, and further when to switch to common transmission mode.

This typically requires the sending to the decoding device of the initial timing advance value between transmission of a video frame within the dedicated multimedia stream and transmission of the same video frame within the common multimedia stream. Yet, the decoding device may also assume some maximum timing advance value (e.g., the maximum GoP duration), and decide by itself when to switch to common transmission mode.

Another embodiment of the present invention is characterized in that said video transmitting means is further adapted to transmit video frames of said dedicated multimedia stream at a transmit rate averagely lower than or equal to a nominal decoding rate corresponding to said nominal motion speed, and averagely higher than or equal to an averagely lower decoding rate corresponding to said averagely slower motion speed.

By so doing, the network load induced by channel change can be reduced, while preserving the aforementioned technical effects.

Further characterizing embodiments are mentioned in the appended claims.

The present invention relates to a network unit adapted to transmit a video channel to be played at a nominal motion speed, the network unit comprising:
  a signaling means adapted to receive a request from a decoding device whereby transmission of said video channel is requested; and
  a video transmitting means adapted thereupon to transmit said video channel towards said decoding device, initially as a dedicated multimedia stream dedicatedly supplied to said decoding device and comprising an independent video frame as first transmitted video frame, and further in time as a common multimedia stream commonly supplied to a plurality of decoding devices.

A decoding device according to the invention is characterized in that said video channel within said dedicated multimedia stream is to be received ahead of time with respect to reception of said video channel within said common multimedia stream, and in that said decoder is further adapted to initially play said video channel at an averagely slower motion speed, thereby allowing said video receiving means to resume reception of said video channel with said common multimedia stream.

Such a decoding device may form part of a subscriber equipment that outputs a video signal to a display unit such as a TV set or screen, a monitor, or to a recording unit such as a video recorder, or may form part of the display or recording unit itself.

Examples of such subscriber equipment are a set top box, a game console, a DSL wired or wireless modem, a wired or wireless router, etc.

The present invention further relates to a system including a network unit and a decoding device according to the invention.

The present invention further relates to a method for transmitting a video channel to be played at a nominal motion speed, which method comprising the steps of:
  receiving a request from a decoding device whereby transmission of said video channel is requested,
  transmitting thereupon said video channel towards said decoding device, initially as a dedicated multimedia stream dedicatedly supplied to said decoding device and comprising an independent video frame as first transmitted video frame, and further in time as a common multimedia stream commonly supplied to a plurality of decoding devices.

A method according to the invention is characterized in that said video channel within said dedicated multimedia stream is transmitted ahead of time with respect to transmission of said video channel within said common multimedia stream, and in that said video channel is to be initially played at an averagely slower motion speed, thereby allowing transmission of said video channel towards said particular decoding unit to be resumed with said common multimedia stream.

The present invention further relates to a method for receiving and playing a video channel at a nominal motion speed, which method comprising the steps of:
  transmitting a request to a network unit whereby transmission of said video channel is requested,
  receiving thereupon said video channel from said network unit, initially as a dedicated multimedia stream dedicatedly supplied to a decoding device and comprising an independent video frame as first received video frame, and further in time as a common multimedia stream commonly supplied to a plurality of decoding devices.

A method according to the invention is characterized in that said video channel within said dedicated multimedia stream is to be received ahead of time with respect to reception of said video channel within said common multimedia stream, and in that said method further comprises the step of initially playing said video channel at an averagely slower motion speed, thereby allowing reception of said video channel to be resumed with said common multimedia stream.

Embodiments of a decoding device according to the invention, of a system according to the invention, of a method for transmitting a video channel according to the invention, and of a method for receiving and playing that video channel according to the invention, correspond with the embodiments of a network unit according to the invention.

BRIEF DESCRIPTION

The above and other objects and features of the invention will become more apparent and the invention itself will be best understood by referring to the following description of an embodiment taken in conjunction with the accompanying drawings wherein.

DETAILED DESCRIPTION

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the present invention, the relevant components of the device are A and B.

Finally, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

Figure 1:
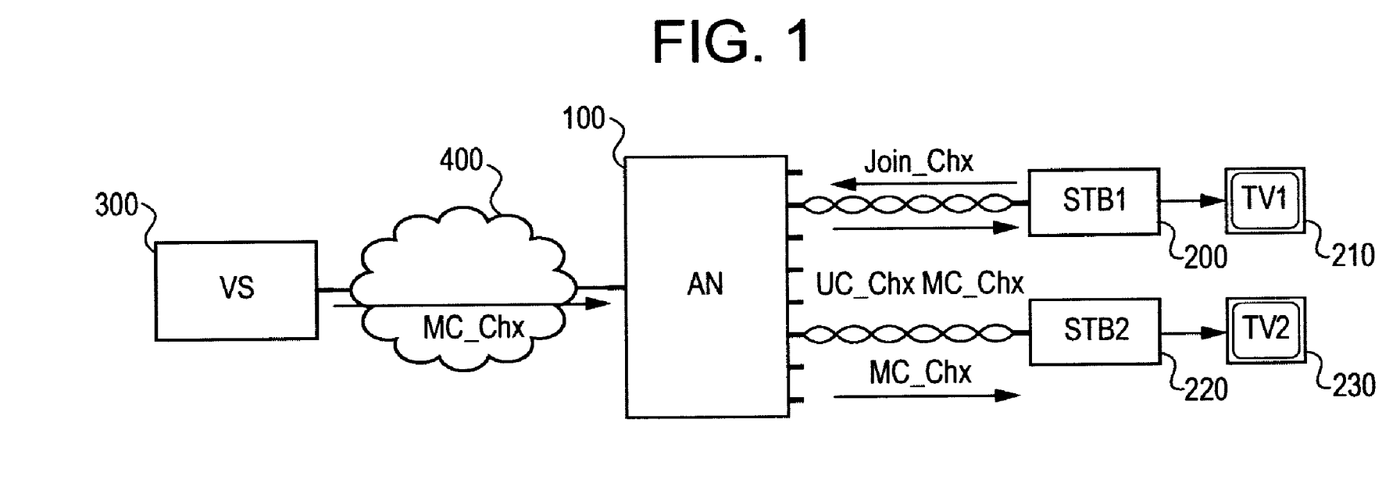
FIG. 1 represents a data communication system for supplying video channels to subscribers.

There is seen in FIG. 1 a data communication system comprising an access unit 100 (or AN) coupled via a data communication network 400 to a video server 300 (or VS), and via twisted copper pairs (or optical fibers or wireless) to subscriber premises. As an exemplary embodiment, 2 premises are shown accommodating set top boxes 200 and 220 (or STB1 and STB2) respectively coupled to display units 210 and 220 (or TV1 and TV2).

Figure 2A:
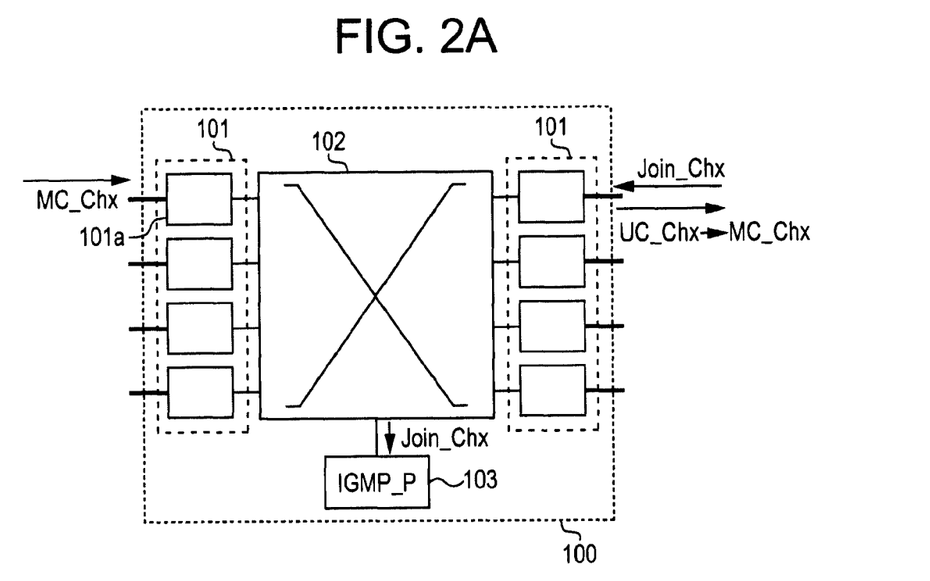
FIG. 2a represents an access unit according to the invention.

There is seen in FIG. 2a further details about the access unit 100. The access unit 100 comprises line termination units 101, a switch fabric 102 and a signaling unit 103 for controlling transmission of video channels towards subscribers. The line termination units 101 and the signaling unit 103 are coupled to the switch fabric 102.

The line termination units 101 and the switch fabric 102 altogether achieve forwarding (or routing) of data packets (or cells, frames) from the data communication 400 towards the subscribers, and vice-versa. A forwarding table (or routing table) holds identifiers of particular output ports through which particular destinations (typically identified by a destination address, possibly in combination with an address mask) are reachable.

In a preferred embodiment of the present invention, the signaling unit 103 is an Internet Gateway Multicast Protocol (IGMP) Proxy (or IGMP_P). The IGMP Proxy 103 acts as a designated multicast router vis-a-vis an IGMP client, and as an IGMP client vis-a-vis a designated multicast router. The IGMP proxy 103 is adapted to answer IGMP membership report and leave messages originating from the IGMP clients housed by the set top boxes 200 and 220. If a particular IGMP client reports a membership to a particular multicast group identified by a particular multicast address, then the IGMP proxy triggers forwarding of the corresponding multicast stream towards that IGMP client. If the multicast stream is not available, then the report is further forwarded towards a designated router, which will in turn feed the access unit 100 with the requested multicast stream.

Other signaling protocol can be used to report multicast memberships and to control which video channel needs to be transmitted. For instance, Multicast Listener Discovery (MLD) protocol is used for IPv6-based system.

Figure 2B:
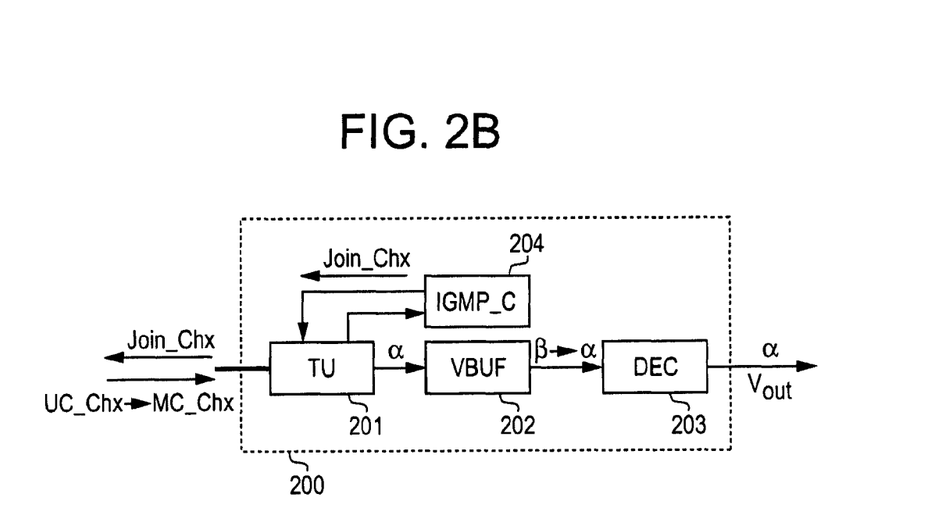
FIG. 2b represents a decoding device according to the invention.

There is seen in FIG. 2b further details about the set top box 200. The set top box 200 comprises a transceiving unit unit 201 (or TU), a de-jitter buffer 202 (or VBUF), a video decoder 203 (or DEC) and an IGMP client 204 (or IGMP_C). The transceiving unit 201 is coupled to both the IGMP client 204, and via the video buffer 202 to the decoder 203.

The transceiving unit 201 accommodates the necessary means for connecting via a subscriber line to the access unit 100, and further to the data communication network 400, and further for receiving and transmitting user traffic through the subscriber line. Received video frames are made available to the decoder 203 via the de-jitter buffer 202.

The decoder is adapted to decode video frames, and to produce an output video signal Vout for further display by the display unit 210. video frames are encoded according to a particular video encoding scheme, such as MPEG2 or MPEG4. Video frames are encoded at a nominal frame rate $\alpha$, and are made available to the display unit 210 at the same frame rate.

Figure 3:
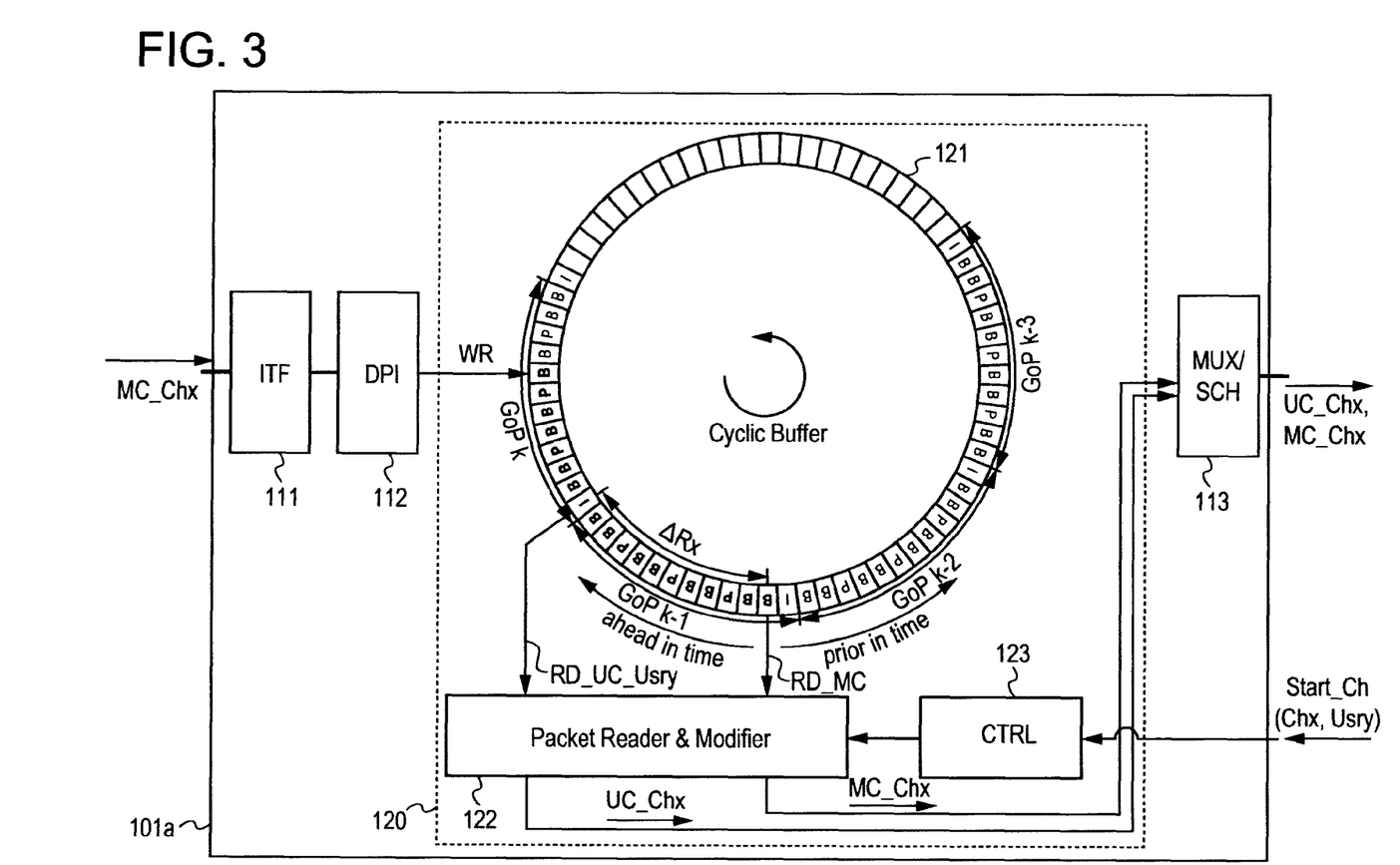
FIG. 3 represents a video transmitting means according to the invention.

There is seen in FIG. 3 further details about a line termination unit 110 coupled to the data communication network 400 (also referred to as a network termination unit as opposed to a subscriber termination unit).

The line termination unit 110 comprises an interface unit 111 (or ITF), a packet selection unit 112 (or DPI, which stands for Deep Packet Inspection), a cyclic buffer 121 for storing video packets, a packet reader and modifier 122, a controller 123 (or CTRL) and a multiplexer/scheduler 113 (or MUX/SCH). The line termination unit 111 is coupled to the packet selection unit 112. The packet selection unit is coupled to the cyclic buffer 121. The packet reader and modifier 122 is coupled to the cyclic buffer 121, to the controller CTRL and to the multiplexer/scheduler 113. The controller CTRL is further coupled, e.g. in-band via the switch fabric or out-band via a dedicated communication medium, to the IGMP proxy 103. The cyclic buffer 121, the packet reader and modifier 122 and the controller 123 make up a video transmitting means 120 according to the invention.

The interface unit 111 accommodates the necessary means for connecting to the data communication network 400, and further for receiving and transmitting user traffic.

The packet selection unit 112 makes use of Deep Packet Inspection (DPI) for selecting video traffic within the ingress traffic, e.g. based on a particular payload/protocol identifier, or on a particular source address (the video server's one), or on a set of multicast destination addresses. The packet selection unit 112 is further adapted then to discriminate within the video traffic between different video channels, e.g., based on a particular multicast destination address, and to re-direct video packets of different video channels towards distinct cyclic buffers.

The cyclic buffer 121 is represented as a turning wheel comprising slots wherein a few GoPs of a particular video channel Chx are stored before being further forwarded. The actual receive order has been omitted purposely so that GoPs are grouped contiguously. Similarly, only video frames are plotted, albeit each video frame consists actually of one or more video packets (the more new picture information, the more payload, the more video packets).

The video channel Chx is initially received as a multicast multimedia stream MC_Chx, that is to say as a multimedia stream comprising video (or multimedia) packets, the destination address of which is a multicast address.

The wheel is turning counter-clockwise at a nominal packet rate $\rho$, resulting in an average frame rate that matches the nominal frame rate $\alpha$. A write pointer WR points towards a memory location, to which video packets of video channel Chx are written, while a common read pointer RD_MC points towards another memory location, from which video packets of video channel Chx are read and further forwarded through the multiplexer/scheduler 113. The minimum distance between WR and RD_MC pointers is one GoP size, introducing at least one GoP delay in watching video channel Chx.

Another dedicated read pointer RD_UC_Usry is created and initialized whenever a new user, presently usry, zaps to the channel Chx. The memory location pointed by RD_UC_Usry depends on the exact time occurrence of the channel change: the pointer RD_UC_Usry points towards the memory location containing the first (or a further) independent frame that is ahead of time with respect to the video frame that is commonly transmitted. To do so, the wheel is scanned clockwise for the first (or a further) independent frame, starting from RD_MC location till WR location. The pointer is released once the new user switches to common transmission mode.

Packets are written to WR location and read from RD_UC and RD_UC_Usry locations at the nominal packet rate $\rho$, meaning that, each time the wheel is turning one slot position counterclockwise, one packet is written to WR location, and one packet is read from each of RD_MC and RD_UC_Usry locations.

An exemplary embodiment of the turning wheel concept make use of a shift register in combination with indirect addressing: video packets are pushed into a memory pool as they are received, while pointers pointing towards those packets are pushed into the turning wheel and shifted by ρ slot positions every seconds. Yet, other embodiments can be though of, such as a single (or doubled) linked list allowing scanning in one (or both) directions.

The packet reader and modifier 122 is adapted to read video packets from RD_UC_Usry location, and to substitute a unicast address (presently, the address of usry) for the initial multicast destination address, thereby yielding a unicast stream UC_Chx.

The packet reader and modifier 122 is further adapted to read video packets from RD_MC location, thereby yielding a multicast stream MC_Chx.

The controller 123 is adapted to control the operation of the packet reader and modifier 122, and to create and initialize a unicast read pointer, presently RD_UC_Usry, whenever a new user, presently usry, zaps to the video channel Chx.

The controller 123 is further adapted to compute the video frame number at which a new user, presently usry, is viewing the video channel Chx synchronously with respect to steady state users that are fed with the multicast stream MC_Chx. This video frame number is computed according to the initial timing advance value between the multicast and unicast pointers, presently between RD_MC and RD_UC_Usry, and according to a slower motion speed value which is assumed to be used by the decoding units while receiving the video channel Chx as a dedicated stream.

The slower motion speed can be either assigned a predetermined value, or can be obtained directly from the set top box 200.

The controller 123 is further adapted to resume transmission of the video channel Chx towards the set top box 200 with the multicast multimedia stream MC_Chx from that video frame number onwards. This is achieved by requesting the packet reader and modifier 122 to stop transmission of the video channel Chx at that frame number, and further by updating the forwarding table for inclusion of the subscriber port, which the set top box 200 is connected to, in the multicast tree of the video channel Chx.

The multiplexer/scheduler 113 is adapted to multiplex, schedule and sending the multicast stream MC_Chx and the unicast stream UC_Chx towards the switch fabric 102 for further forwarding towards subscriber ports.

Figure 4:
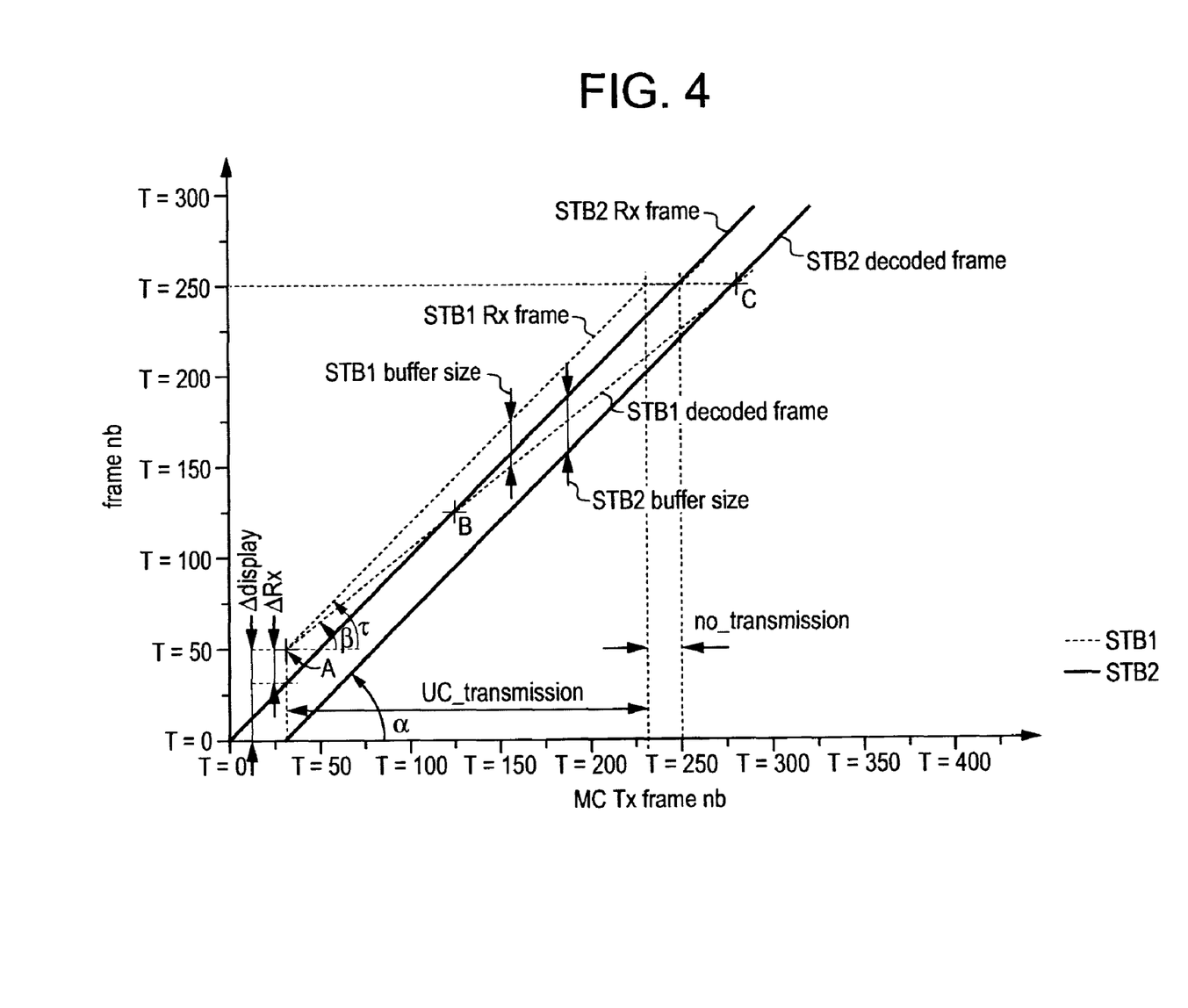
FIG. 4 to 6 are time diagrams for a better insight of the invention.

An operation of the preferred embodiment follows with regard to FIG. 4.

There is seen in FIG. 4 a time-diagram wherein the multicast transmit frame number (or MC Tx frame nb) is plotted on the x-axis as a common time reference. A GoP size of 25 frames is used as an illustrative figure.

Initially, the set top box 220 is supplied with the multicast stream MC_Chx, and decodes that stream at the nominal motion speed α. The frame numbers received and decoded by the set top box 220 are plotted as 45° straight line (see STB2 Rx frame and STB2 decoded frame). The transmission delay is assumed to be negligible. The frame number difference between both lines determines the amount of video frames that are buffered in the de-jitter buffer of STB2 (see STB2 buffer size).

The user usry, who was watching a video channel on the display unit 210, switches to the video channel Chx. Consequently, the IGMP client 204 sends to the IGMP proxy 103 an IGMP leave message for the former channel, and an IGMP membership report message Join_Chx for the newly requested channel.

The IGMP proxy 103 extracts the unicast source address and the multicast destination address from Join_Chx message. The latter is used to identify the requested video channel, presently Chx, and thus the line termination unit and further the cyclic buffer wherein that channel is temporarily stored, presently the line termination unit 110 and the cyclic buffer 121. The former is sent as part of a trigger that requests the video transmitting means 120 to start transmission of video channel Chx towards usry (see Start_Ch(Chx, usry) in FIG. 3).

Upon receipt of that trigger, the controller 123 scans the cyclic buffer 121 for the video packet conveying the first independent frame, starting from RD_MC location clockwise. Then, the controller 123 initializes the dedicated read pointer RD_UC_Usry, and passes the pointer value together with the unicast source address to the packet reader and modifier 122.

The first transmitted video frame towards the set to box 200 is plotted as A in FIG. 4 (frame number 50), and the distance between RD_MC and RD_UC_Usry is plotted as ΔRx.

From that time onwards, the packet modifier and reader 122 starts reading video packets from RD_UC_Usry location at the nominal packet rate ρ, and substitutes for the initial multicast destination address the unicast source address received from the controller 123, thereby yielding the unicast multimedia stream UC_Chx. The unicast stream UC_Chx is forwarded together with the multicast stream MC_Chx to the multiplexer/scheduler 113 for further forwarding. At that instant of time, the forwarding table, which controls forwarding of data packets through the switch fabric 102, enjoins the unicast stream UC_Chx to be forwarded towards a subscriber port, which the set top box 200 is connected to, and the multicast stream MC_Chx to be forwarded towards another subscriber port, which the set top box 220 is connected to.

Thereupon, the set top box 200 starts receiving video frames of the video channel Chx as a unicast stream (see STB1 Rx frame and UC_transmission), and can display that channel almost instantaneously since the first received video frame is an independent frame.

Yet, the decoder 203 will decode those first video frames at a slower motion speed β (see STB1 decoded frame). Consequently, the de-jitter buffer will start filling up (see STB1 buffer size).

After a while, the set top box 200 will decode and further display a video frame that was already sent to the steady state users (see point B).

Meanwhile, the controller 123 computes the frame number at which the set top box 200 will decode the same video frame as the set top box 220 will (see point C). This video frame number can be easily computed according to the initial timing advance value ΔRx, the slower motion speed β, and the assumed steady amount of buffered video frames (see STB2 buffer size).

The controller 123 passes the so-computed frame number to the packet reader and modifier 122: when that frame number is read from RD_UC_Usry location, the packet reader and modifier 122 releases the unicast pointer RD_UC_Usry, and stops transmission of the unicast stream UC_Chx towards the set top box 200.

In a further step, the controller 123 updates the forwarding table for inclusion of the subscriber port, which the set top box 200 is connected to, in the multicast tree of the video channel Chx, thereby resulting in the transmission of the multicast stream MC_Chx towards the set top box 200 too.

Updating of the forwarding table takes place during the no_transmission period, during which no video frame is sent to the set top box 200 (=ΔRx). This silent period allows unconstrained updating of the forwarding table: transmission of channel Chx can be resumed from the so-computed frame number, or from an earlier frame number (in which case, duplicated video packets are received by the set top box 200 and need be discarded).

From that time onwards, the set top box 200 starts receiving the multicast stream MC_Chx. This is the trigger for the set top box 200 to resume the nominal motion speed α, thereby joining the group of steady state users that are watching the video channel Chx synchronously.

Figure 5:
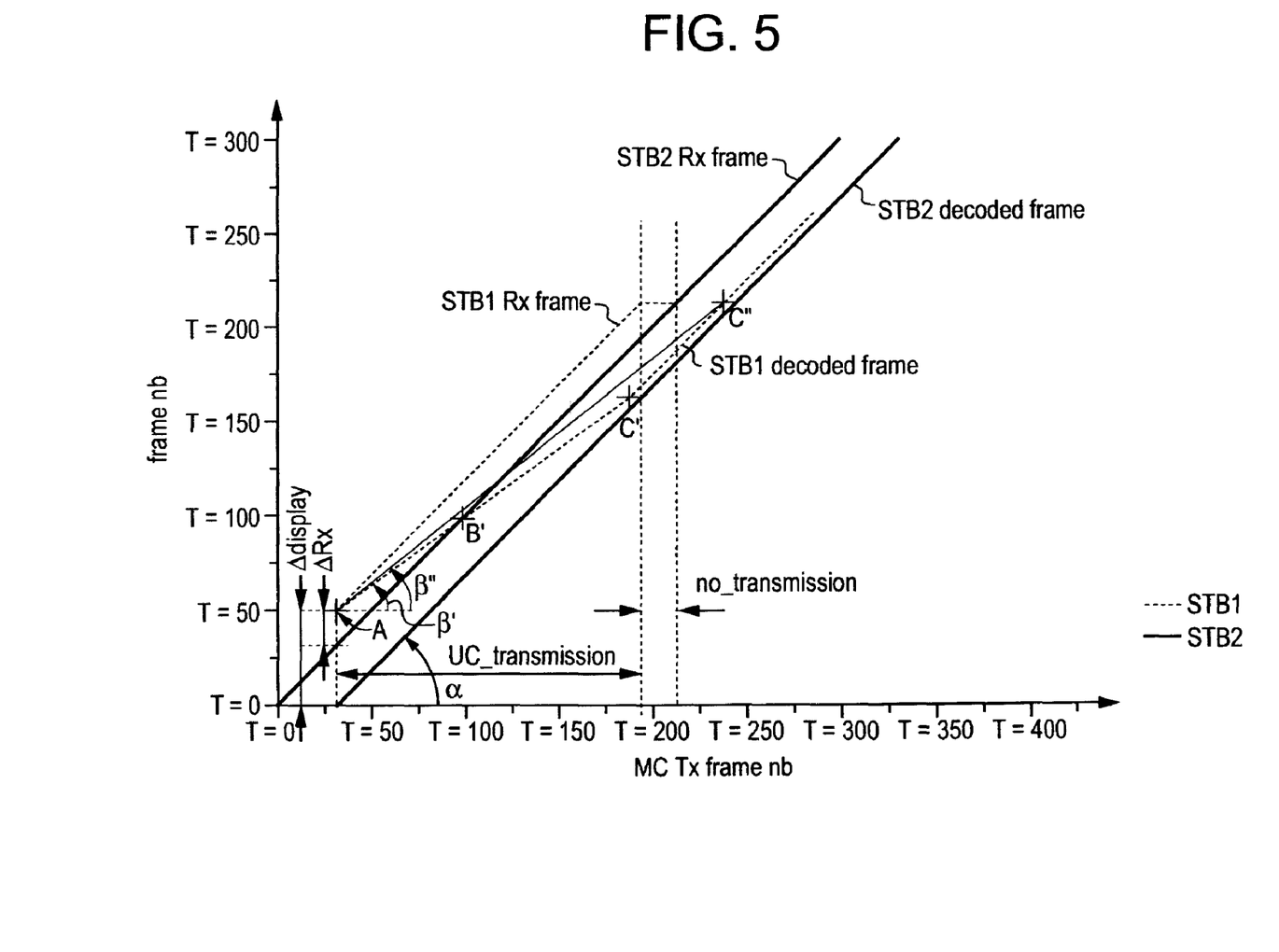

There is seen in FIG. 5 an alternative embodiment of the present invention, wherein the set top box 200 applies a even lower motion speed β' so as to catch up with the steady state users more quickly (B' is ahead of time with respect to B). In this embodiment, the set top box 200 resumes the nominal motion speed while still receiving the video channel Chx as a unicast stream. The set top box 200 further sends a control signal (not shown) whereby transition to multicast transmission mode is requested. Upon receipt of that signal, the access unit 100 stops unicast transmission, and resumes transmission of the video channel Chx with the multicast stream MC_Chx.

In this embodiment, the set top box 200 has no knowledge of the initial timing advance ΔRx, and thus is unable to synchronize with the steady state users. Yet, the set top box 200 assumes some maximum value for the initial timing advance ΔRx (e.g., the size of one GoP) so as the nominal motion speed is not resumed too soon.

It is to be noticed that the video sequence sent as a unicast stream is still played at an averagely slower motion speed β".

Figure 6:
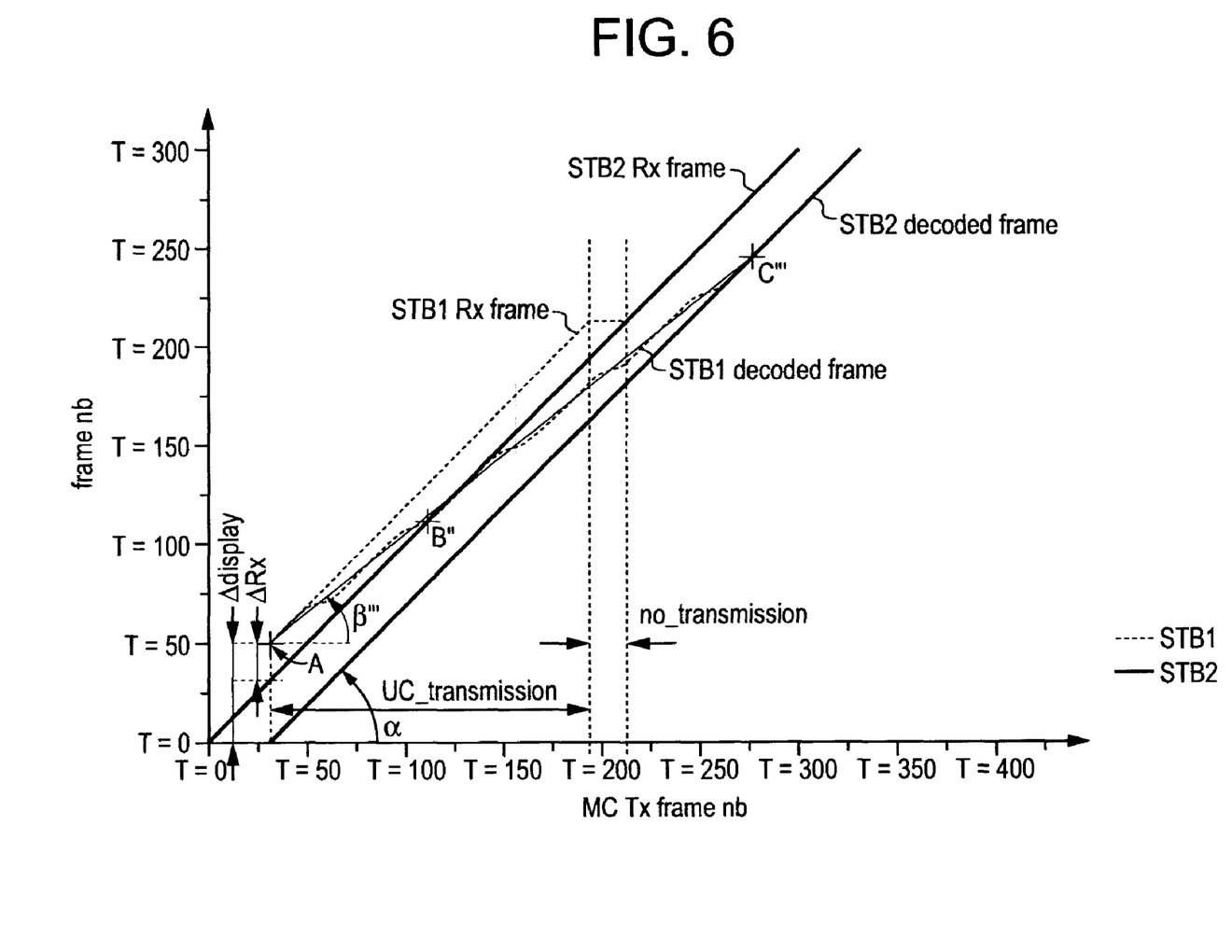

There is seen in FIG. 6 a further embodiment of the present invention, wherein the set top box 200 applies a particular transition algorithm. A slower motion speed is applied at particular time instances, e.g. during scene transition, thereby resulting in an averagely slower motion speed β'''. Other transition algorithms may be thought of without departing from the spirit of the invention.

The initial timing advance ΔRx is passed to the set top box 200, possibly with a steady amount of video frames that shall be buffered by the set top box 200 to accommodate with packet jitter and transmission errors. The set top box 200 then computes a video frame number at which the nominal motion speed shall be resumed for the viewer to watch the video channel Chx synchronously with the steady state users (i.e., at C''').

In a first embodiment, the access unit 100 assumes some minimum value for the slower motion speed that is applied by the set top box 200, and transmit a fixed-length unicast stream that allows the set top box 200 to resume reception of the video channel Chx with the multicast stream MC_Chx (i.e., that allows the set top box 200 to reach point B'').

In a second embodiment, the set top box 200 computes a second video frame number at which transmission of the video channel Chx can be resumed with the multicast stream MC_Chx, and requests the access unit 100 to switch to multicast transmission mode from that video frame number (or a further video frame number) onwards.

It is to be noticed in FIG. 6 that both the unicast and multicast stream are played at an averagely slower motion speed before the nominal motion speed is resumed.

In still a further embodiment of the present invention, the video transmitting means 120 is adapted to dedicatedly transmit video frames of the video channel Chx at a transmit rate τ comprised between the nominal frame rate α and the averagely lower decoding rate that is applied by the set top box 200, thereby reducing the induced network load while still allowing the set top box 200 to catch up with the steady state users. The no_transmission period is shortened accordingly, and update of the forwarding table will get more and more stringent as the transmit rate τ gets closer to the averagely lower decoding rate.

Video transmitting means according to the invention can be implemented in the video server 300 as well. For instance, the set top box 200 sends a first proprietary signaling message to the video server 300 for triggering the transmission of the unicast stream UC_Chx, and further in time a second standard IGMP membership report message to the access node 100 for subscribing to the multicast stream Mc_Chx. In this embodiment, the set top box 200 decides when to switch to multicast mode, possibly taking account the initial timing advance value supplied by the video server 300 for achieving full synchronization with the steady state users.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A network unit that transmits a video channel to be played at a nominal motion speed, the network unit comprising:

a signaling unit configured to receive a request from a decoding device requesting transmission of said video channel;

a buffer including a plurality of memory locations configured to store one or more of a plurality of frames of said video channel, said buffer including at least a common read pointer and a dedicated read pointer each pointing to one of said plurality of memory locations; and a video transmitting unit configured to transmit said video channel towards said decoding device, initially as a dedicated multimedia stream dedicatedly supplied to said decoding device and including an anchor frame as a first transmitted video frame of said plurality of video frames based on said dedicated read pointer, and further in time as a common multimedia stream commonly supplied to a plurality of decoding devices based on said common read pointer, wherein said video transmitting unit is further configured to transmit said video channel within said dedicated multimedia stream having an earlier time frame with respect to transmission of said video channel within said common multimedia stream based on positions of said dedicated and common read pointers, and said transmitted dedicated multimedia stream is to be played by said decoding device at an averagely slower motion speed than said common multimedia stream is to be played by said decoding device so as to allow transmission towards said decoding device of said video channel initially within said transmitted dedicated multimedia stream to be resumed with said common multimedia stream.

2. The network unit according to claim 1, wherein said network unit is further configured to control a motion speed at which said video channel is to be played by said decoding device.

3. The network unit according to claim 2, wherein said averagely slower motion speed is assigned a predetermined value.

4. The network unit according to claim 2, wherein said signaling unit is further configured to receive from said decoding device said averagely slower motion speed.

5. The network unit according to claim 2, wherein said video transmitting unit is further configured to transmit said video channel as said common multimedia stream once said nominal motion speed is to be resumed.

6. The network unit according to claim 1, wherein said signaling unit is further configured to receive a control signal from said decoding device whereby transmission of said common multimedia stream is requested.

7. The network unit according to claim 6, wherein said signaling unit is further configured to send to said decoding device a time advance value ($\Delta Rx$) between transmission of said video channel within said dedicated multimedia stream and transmission of said video channel within said common multimedia stream.

8. The network unit according to claim 1, wherein said video transmitting unit is further configured to transmit video frames of said dedicated multimedia stream at a transmit rate ($\tau$) averagely lower than or equal to a nominal decoding rate corresponding to said nominal motion speed, and averagely higher than or equal to an averagely lower decoding rate corresponding to said averagely slower motion speed.

9. A subscriber equipment including a decoding device according to claim 8, and further configured to transmit a video signal (Vout) that is a decoded representation of said video channel.

10. The subscriber equipment according to claim 9, wherein said subscriber equipment is a set top box.

11. The subscriber equipment according to claim 9, wherein said subscriber equipment is a home gateway.

12. The subscriber equipment according to claim 9, wherein said subscriber equipment is a game console.

13. A display unit including the decoding device according to claim 8.

14. A recording unit including the decoding device according to claim 8.

15. The network unit according to claim 1, wherein said dedicated multimedia stream is a unicast stream, and said common multimedia stream is a multicast stream.

16. The network unit according to claim 1, wherein said network unit is an access node for connecting subscribers to a data communication network.

17. The network unit according to claim 1, wherein said network unit is a video server for supplying video channels to subscribers.

18. A system comprising:
a network unit according to claim 1; and
a decoding device including,
  a decoder configured to play said video channel at said nominal motion speed;
  a signaling unit configured to transmit a request to said network unit requesting transmission of said video channel; and
  a video receiving unit configured to receive said video channel from said network unit initially as said dedicated multimedia stream (UC_Chx) dedicatedly supplied to said device and including said anchor frame as said first received video frame, and further in time as said common multimedia stream commonly supplied to said plurality of decoding devices, wherein
said video channel within said dedicated multimedia stream is to be received having an earlier time frame with respect to reception of said video channel within said common multimedia stream, and
said decoder is further configured to initially play said video channel within said transmitted dedicated multimedia stream at an averagely slower motion speed than said common multimedia stream is to be played by said decoder so as to allow said video receiving unit to resume reception of said video channel initially within said transmitted dedicated multimedia stream with said common multimedia stream.

19. A decoding device comprising:
a decoder configured to play a video channel at a nominal motion speed;
a signaling unit configured to transmit a request to a network unit requesting transmission of said video channel;
a buffer including a plurality of memory locations configured to store one or more of a plurality of frames of said video channel, said buffer including at least a common read pointer and a dedicated read pointer each pointing to one of said plurality of memory locations; and
a video receiving unit configured to receive said video channel from said network unit, initially as a dedicated multimedia stream dedicatedly supplied to said device and including an anchor frame as a first received video frame of said plurality of video frames based on said dedicated read pointer, and further in time as a common multimedia stream commonly supplied to a plurality of decoding devices based on said common read pointer, wherein
said video channel within said dedicated multimedia stream is to be received having an earlier time frame with respect to reception of said video channel within said common multimedia stream based on positions of said dedicated and common read pointers, and
said transmitted dedicated multimedia stream of said decoder is further configured to initially play said video channel at an averagely slower motion speed than said common multimedia stream of said decoder is play said video channel so as to allow said video receiving unit to resume reception by said decoding device of said video channel initially within said transmitted dedicated multimedia stream with said common multimedia stream.

20. A method for transmitting a video channel to be played at a nominal motion speed the method comprising:
receiving a request from a decoding device requesting transmission of said video channel;
storing one or more of a plurality of frames of said video channel at a plurality of memory locations, said storing step stores at least a common read pointer and a dedicated read pointer each pointing to one of said plurality of memory locations; and
transmitting said video channel towards said decoding device, initially as a dedicated multimedia stream dedicatedly supplied to said decoding device and including an anchor frame as a first transmitted video frame of said plurality of video frames based on said dedicated read pointer, and further in time as a common multimedia stream commonly supplied to a plurality of decoding devices based on said common read pointer, wherein
said video channel within said dedicated multimedia stream is transmitted having an earlier time frame with respect to transmission of said video channel within said common multimedia stream based on positions of said dedicated and common read pointers, and said transmitted dedicated multimedia stream is to be initially played by said decoding device at an averagely slower motion speed than said common multimedia stream is to be played by said decoding device so as to allow transmission towards said decoding device of said video channel initially within said transmitted dedicated multimedia stream to be resumed with said common multimedia stream.

21. A method for receiving and playing a video channel at a nominal motion speed the method comprising:

transmitting a request to a network unit requesting transmission of said video channel;

storing one or more of a plurality of frames of said video channel at a plurality of memory locations, said storing step stores at least a common read pointer and a dedicated read pointer each pointing to one of said plurality of memory locations; and receiving said video channel from said network unit, initially as a dedicated multimedia stream dedicatedly supplied to a decoding device and including an anchor frame as a first received video frame of said plurality of video frames based on said dedicated read pointer, and further in time as a common multimedia stream commonly supplied to a plurality of decoding devices based on said common read pointer, wherein said video channel within said dedicated multimedia stream is to be received having an earlier time frame with respect to reception of said video channel within said common multimedia stream based on positions of said dedicated and common read pointers, and said transmitted dedicated multimedia stream is to be initially played by said decoding devices at an averagely slower motion speed than said common multimedia stream is to be played by said decoding device so as to allow reception by said decoding device of said video channel initially within said transmitted dedicated multimedia stream to be resumed with said common multimedia stream.

* * * * *